(12) United States Patent
Ericson

(10) Patent No.: US 6,928,693 B1
(45) Date of Patent: Aug. 16, 2005

(54) BLOWER WITH DUAL TUBES

(76) Inventor: William A. Ericson, 4070 Arrow Way, Sarasota, FL (US) 34232

(*) Notice: Subject to any disclaimer, the term of this patent is extended or adjusted under 35 U.S.C. 154(b) by 351 days.

(21) Appl. No.: 10/266,200

(22) Filed: Oct. 7, 2002

(51) Int. Cl.7 ................................................ A47L 5/14
(52) U.S. Cl. ........................ 15/405; 15/327.5; 134/42
(58) Field of Search ............................. 15/405, 327.5, 15/330; 417/234; 134/21, 42

(56) References Cited

U.S. PATENT DOCUMENTS

| | | | | |
|---|---|---|---|---|
| 4,658,778 A | * | 4/1987 | Gamoh et al. ............. | 15/327.5 |
| 4,799,287 A | * | 1/1989 | Belanger et al. ............. | 15/405 |
| 5,011,058 A | * | 4/1991 | Sapp et al. ................ | 15/327.5 |
| 5,083,340 A | * | 1/1992 | Takahashi et al. ............ | 15/405 |
| 5,195,208 A | * | 3/1993 | Yamami et al. ............ | 15/327.5 |
| 5,813,088 A | * | 9/1998 | Wagner et al. ............. | 15/327.5 |
| 6,073,305 A | * | 6/2000 | Hesskamp ................... | 15/405 |
| 6,076,231 A | * | 6/2000 | Bucher ........................ | 15/405 |
| 6,182,329 B1 | * | 2/2001 | Lin ............................. | 15/405 |
| D444,274 S | * | 6/2001 | Griffin ........................ | D32/15 |
| 6,253,415 B1 | * | 7/2001 | Honda .......................... | 15/405 |
| 6,305,048 B1 | * | 10/2001 | Salisian ..................... | 15/327.5 |
| 6,568,026 B2 | * | 5/2003 | Roy et al. .................. | 15/327.5 |

* cited by examiner

*Primary Examiner*—Theresa T. Snider

(57) ABSTRACT

A backpack blower has a lightweight engine, a starter, a fuel tank, a fan, a frame for the engine, two hollow tubes, and a control mechanism upon one tube. The blower improvement comes from a housing and two elbows. The round housing contains the fan and has two tangential outlets. The two elbows have a generally round cross section and a generally right angle shape. On each elbow, the first end connects with an outlet and the second end joins a tube. The elbows rotate and bend, directing leaves and debris with airflow from the tubes.

19 Claims, 3 Drawing Sheets

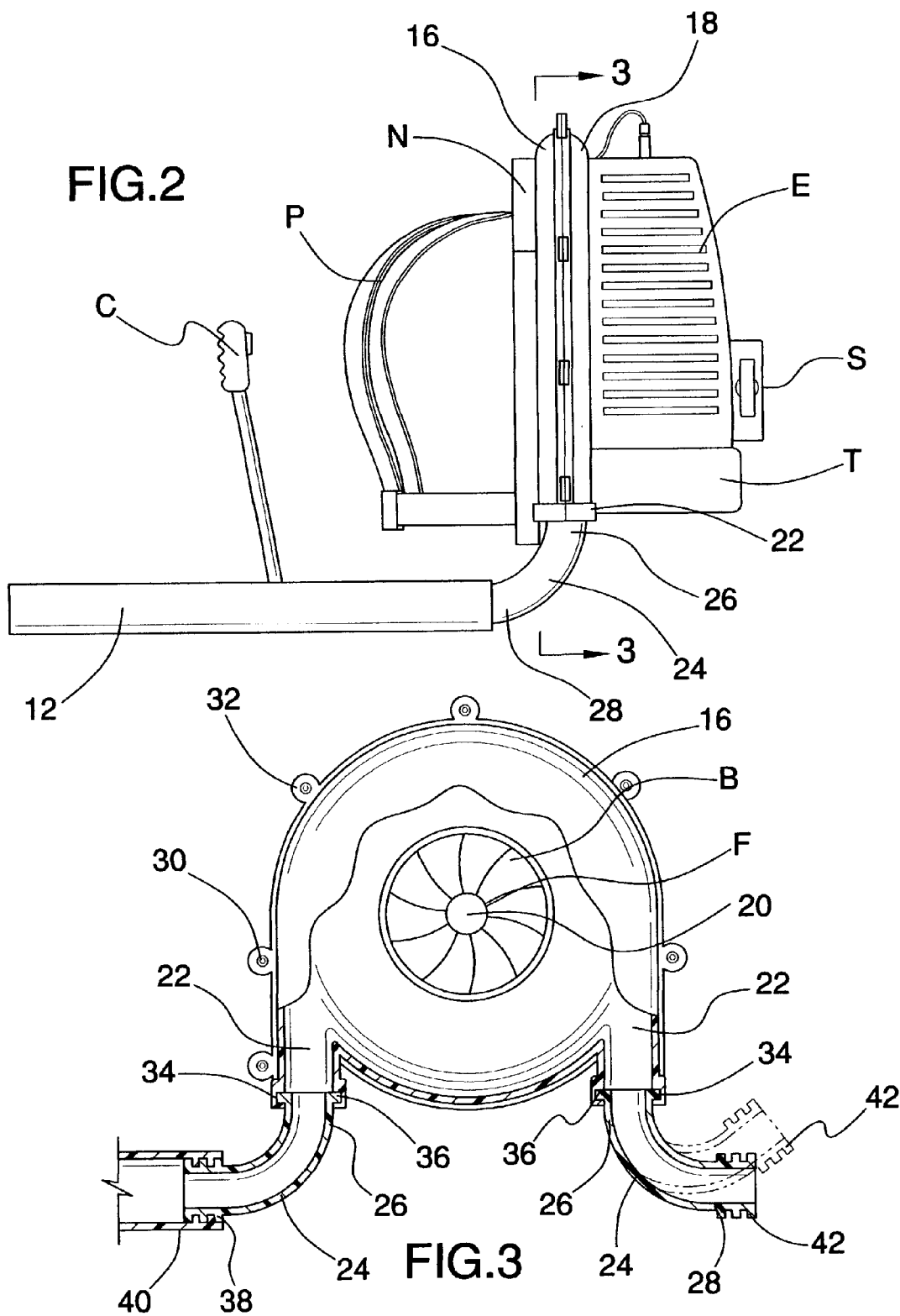

BLOWER WITH DUAL TUBES

BACKGROUND OF THE INVENTION

1. Field of the Invention

The present invention relates to a blower with dual tubes for use in connection with dispersing debris from lawns, driveways, or other grounds. The blower with dual tubes has particular utility in connection with directing debris to a precise location.

2. Description of the Prior Art

Blowers with dual tubes are desirable for commercial lawn companies and homeowners. Blowers typically disperse or collect debris usually lawn clippings and leaves. A typical blower has a fan that rotates in a plane generally perpendicular to the ground. The fan directs airflow from a housing through an outlet and into a single tube. Blowers often mount to a backpack frame carried by an operator. Of necessity, blowers have the least weight possible and occupy a small volume. The backpack frame has straps and a belt for removably supporting a blower upon an operator.

In spring and summer, blowers disperse lawn clippings and debris from sidewalks upon completion of lawn mowing. An operator carries a blower along a sidewalk to blow the sidewalk clean. The operator merely blows the clippings out of the way. In fall, blowers direct leaves into piles for collection and then removal. An operator carries a blower across a lawn, blowing the leaves together towards a common point. The operator changes his position to direct the airflow of a blower. Collecting leaves requires multiple adjustments by the operator controlling a single tube.

The use of backpack blowers is known in the prior art. For example, U.S. Pat. No. 6,253,415 to Honda discloses a knapsack engine driven tool. However, the Honda '415 patent does not have two outlets, and has further drawbacks of no elbow and no separate tube.

U.S. Pat. No. 4,658,778 to Gamoh et al. discloses a piggyback type blower unit that disperses chemicals. However, the Gamoh '778 patent does not have two outlets, and additionally does not have a pivoting tube.

Similarly, U.S. Pat. No. 5,195,208 to Yamami et al. discloses a backpack power blower that reduces noise. However, the Yamami '208 patent does not have two blowout tubes.

Similarly, U.S. Pat. No. 5,011,058 to Sapp et al. discloses a blower backack frame that increases air intake. However, the Sapp '058 patent does not have dual tubes and cannot rotate and pivot elbows about an air outlet.

Similarly, United States Patent Number Des. 444,274 to Griffin discloses a blower that operates electrically and is handheld. However, the Griffin '274 patent does not have dual outlets and elbows to direct the airflow.

Lastly, U.S. Pat. No. 6,073,305 to Hesskamp discloses a debris blower that mounts beneath a tractor. However, the Hesskamp '305 patent does not have tubes extending substantially outward from the housing, and has the additional deficiencies of no backpack mounting and a separate power source.

While the above-described devices fulfill their respective, particular objectives and requirements, the aforementioned patents do not describe a blower with dual tubes that allows directing debris to a precise location. The Honda '415, Gamoh '778, Yamami '208, Sapp '058, and Griffin '274 patents make no provision for dual tubes that pivot upon elbows extending from air outlets. The Hesskamp '305 patent has no backpack mounting and no integral power source. Therefore, a need exists for a new and improved blower with dual tubes that can be used for directing debris to a precise location. In this regard, the present invention substantially fulfills this need. In this respect, the blower with dual tubes according to the present invention substantially departs from the conventional concepts and designs of the prior art, and in doing so provides an apparatus primarily developed for the purpose of directing debris to a precise location.

SUMMARY OF THE INVENTION

In view of the foregoing disadvantages inherent in the known types of backpack blowers now present in the prior art, the present invention provides an improved blower with dual tubes, and overcomes the above-mentioned disadvantages and drawbacks of the prior art. As such, the general purpose of the present invention, which will be described subsequently in greater detail, is to provide a new and improved blower with dual tubes and method which has all the advantages of the prior art mentioned heretofore and many novel features that result in a blower with dual tubes which is not anticipated, rendered obvious, suggested, or even implied by the prior art, either alone or in any combination thereof.

To attain this, the present invention essentially comprises a backpack blower for blowing leaves and debris with a lightweight engine, a starter, a fuel tank, a fan powered by the engine, a frame supporting the engine, two hollow tubes, and an control mechanism. The blower improvement comes from a housing and two elbows. The housing has a front half and a rear half that mate to each other to contain the fan, a generally round shape with an intake for the fan in the rear half, and two tangential outlets from the housing. The two elbows have a generally round cross section on a plane normal to the length of the elbow, a first end and an opposite second end, and a generally right angle shape whereby the first end is generally perpendicular to the second end. On each elbow, the first end connects with one of the outlets and the second end joins one of the tubes. To assist a blower operator, each elbow moves independently left and right, and up and down. There has thus been outlined, rather broadly, the more important features of the invention in order that the detailed description thereof that follows may be better understood and in order that the present contribution to the art may be better appreciated.

The invention may also include round, parallel and tangential outlets, a round fan with radial blades, and a housing made of lightweight material with a front half removably fastened to a rear half. The elbows may connect with outlets and tubes using grooves, flanges, and threads. Flexible materials may form the elbows. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and the scope of the present invention.

It is therefore an object of the present invention to provide a new and improved blower with dual tubes that has all of the advantages of the prior art backpack blowers and none of the disadvantages.

It is another object of the present invention to provide a new and improved blower with dual tubes that may be easily and efficiently manufactured and marketed.

An even further object of the present invention is to provide a new and improved blower with dual tubes that has a low cost of manufacture with regard to both materials and labor, and which accordingly is then susceptible of low prices of sale to the consuming public, thereby making such blower with dual tubes economically available to the buying public.

Still another object of the present invention is to provide a new blower with dual tubes that provides in the apparatuses and methods of the prior art some of the advantages thereof, while simultaneously overcoming some of the disadvantages normally associated therewith.

Even still another object of the present invention is to provide a blower with dual tubes for directing debris to a precise location. This allows collection and removal of debris in less time.

Still yet another object of the present invention is to provide a blower with dual tubes for directing debris to a precise location. This makes it possible to direct debris with minimal movement of an operator carrying a blower.

Still yet another object of the present invention is to provide a blower with dual tubes for directing debris to a precise location. This makes it possible to position each tube independently of the other.

Lastly, it is an object of the present invention to provide a new and improved method of blowing leaves and debris with a backpack blower that generates airflow within a housing from an engine powered blower. The method begins with positioning two outlets mutually parallel and tangential to the housing, then connecting elbows to the outlets, and joining tubes to the elbows. The elbows rotate and bend to permit an operator to direct leaves and debris with airflow from two tubes.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the blower with dual tubes of the present invention with the control mechanism in the background.

FIG. 3 is a section view of the housing, outlets, and elbows of the blower with dual tubes of the present invention.

The same reference numerals refer to the same parts throughout the various figures.

DESCRIPTION OF THE PREFERRED EMBODIMENT

Figure 1:
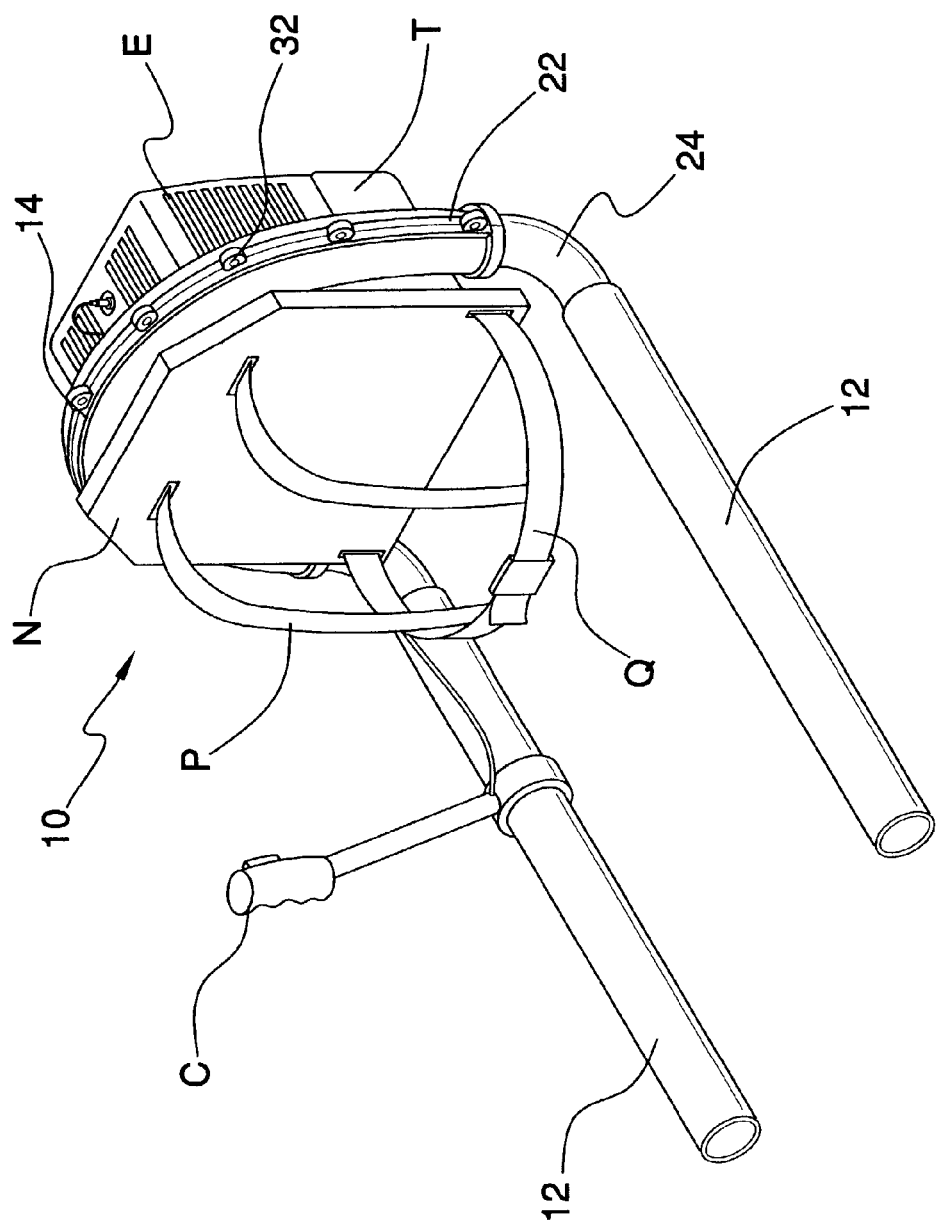
FIG. 1 is an oblique view of the preferred embodiment of the blower with dual tubes constructed in accordance with the principles of the present invention.

Referring now to the drawings, and particularly to FIGS. 1–4, a preferred embodiment of the blower with dual tubes of the present invention is shown and generally designated by the reference numeral 10.

In FIG. 1, a new and improved blower 10 with dual tubes 12 of the present invention for directing debris to a precise location is illustrated and will be described. An operator generally carries the blower 10 with dual tubes 12 upon the operator's back with straps P, a belt Q, and a frame N. More particularly, the blower 10 with dual tubes 12 has a conventional design comprising an engine E, a starter S, a fuel tank T, a fan F powered by the engine E, a frame N supporting the engine E, and a control mechanism C. Two hollow tubes 12 connected to two outlets 22 upon the housing 14 improve upon the conventional design. The engine E is a typical two-cycle internal combustion engine E provided with fuel from the fuel tank T. An operator starts the blower 10 with dual tubes 12 by pulling the starter S. In the preferred embodiment, the control mechanism C mounts to the tube 12 on the operator's right. The operator controls the engine E and the blower 10 through the control mechanism C. The control mechanism C may attach to either tube 12 to suit operator preference. The frame N serves as the attachment point for the housing 14 and then the engine E. The housing 14 has two parts: a front half 16 and a rear half 18. The front half 16 of the housing 14 attaches to the frame N and the engine E attaches to the rear half 18 of the housing 14. Within the housing 14, the fan F connects to the engine E through the rear half 18. The front half 16 also has an intake 20 to admit air. When rotated, the fan F discharges air through the housing 14 and then the tubes 12 for such purposes as blowing leaves or grass clippings.

The housing 14 has a generally round shape with two outlets 22. The outlets 22 direct the airflow tangential to the housing 14 and beneath the engine E. In the preferred embodiment, the outlets 22 are mutually parallel and have a round cross section on a plane perpendicular to the length of the outlet 22. The outlets 22 generally discharge the airflow downwards towards the feet of the operator. The front half 16 of the housing 14 mates with the rear half 18 while fasteners 30 join the matching tabs 32 of the front half 16 and the rear half 18. In the preferred embodiment, the fasteners 30 are nuts and bolts with lock washers.

An elbow 24 extends beneath each outlet 22. The elbow 24 has a first end 26, a second end 28, a generally right angle shape, and a round cross section on a plane perpendicular to the length of the elbow 24. The first end 26 is generally perpendicular to the second end 28. The elbow 24 joins to the outlet 22 at the first end 26, permitting the elbow 24 to rotate to the operator's left and right. The elbow 24 joins with a tube 12 at the second end 28, permitting the elbow 24 to bend towards and away from the ground when an operator carries the blower 10 with dual tubes 12. In the preferred embodiment, the elbow 24 is rubber, capable of repetitive bending.

Turning to FIG. 2, the assembled housing 14 rests between the frame N and the engine E. The housing 14 also mounts to the frame N and the engine E. The outlets 22 descend from the housing 14 where the elbows 24 attach. The tubes 12 join the elbows 24 and have an orientation forward and ahead of the engine E.

FIG. 3 reveals the connections of the elbows 24, outlets 22, and tubes 12. In the preferred embodiment, the outlets 22 are mutually parallel and tangential to the housing 14. Each outlet 22 ends with an internal groove 34 following the perimeter of the outlet 22. Each first end 26 of an elbow 24 has an external flange 36 around the entire perimeter of the first end 26. The flange 36 of the first end 26 fits within the groove 34 of the outlet 22. The flange 36 freely rests within the groove 34 permitting the elbow 24 to rotate to the left and the right of the operator. Each second end 28 of an elbow 24 has two or more first flanges 38 extending out from the elbow 24. An end of a tube 12 has two or more second flanges 40 extending within the tube 12. The second flanges 40 seat about the first flanges 38 joining the tube 12 to the elbow 24. In an alternate embodiment, the second end 28 of the elbow 24 joins the tube 12 with matching threads 42, the second end 28 has external threads 42 while the tube 12 has internal threads 42. FIG. 3 also shows one elbow 24 bending and the elbows 24 bend on both sides of the blower 10 with dual tubes 12. In the preferred embodiment, the elbow 24 is rubber. In alternate embodiment, the elbow 24 has pleats around the circumference to permit bending. The fan F connects directly to the engine E while rotating coplanar with and within the rear half 18 of the housing 14. The fan F has a generally round shape with blades B extending radially.

Figure 4:
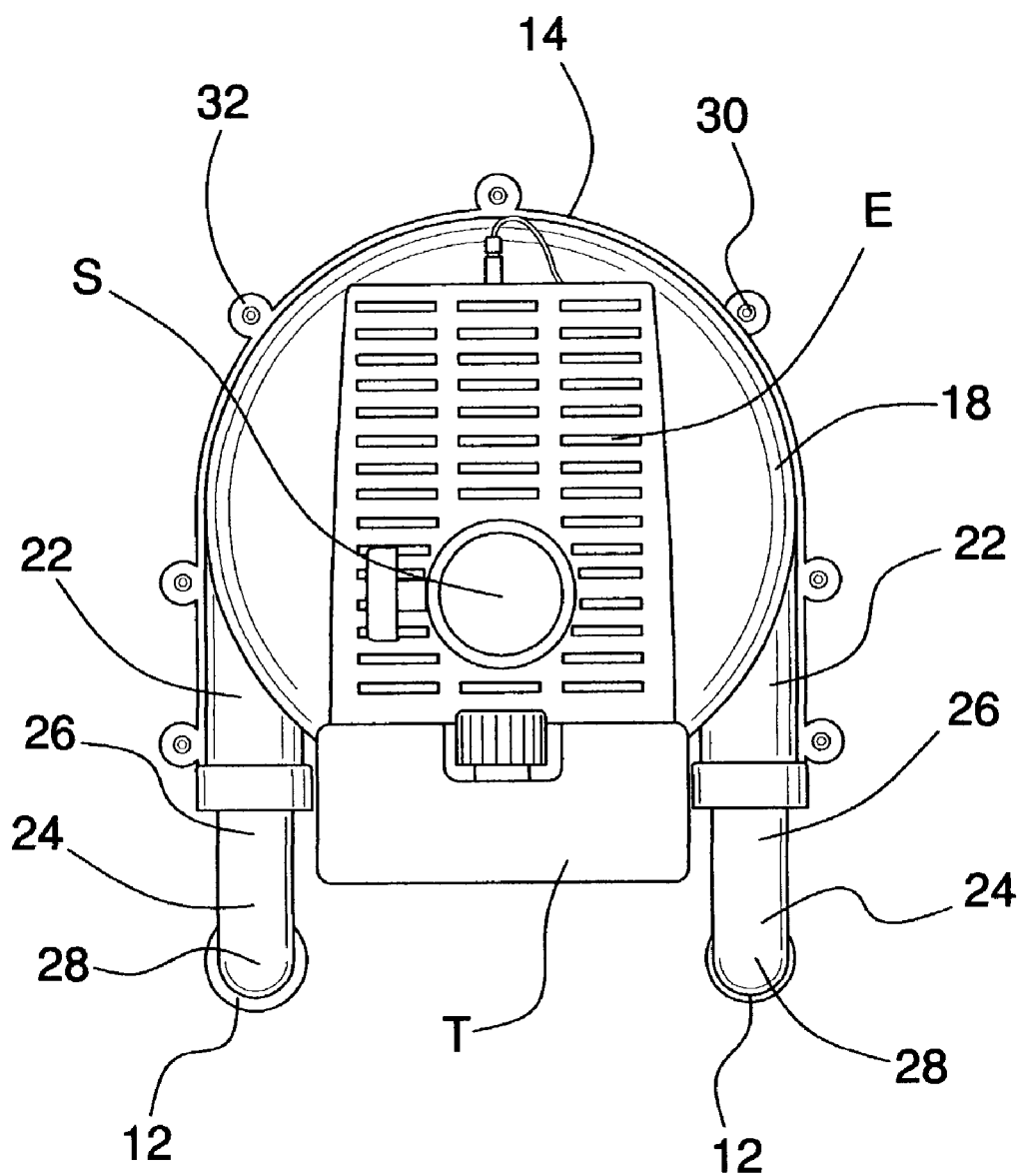
FIG. 4 is a rear view of the blower with dual tubes of the present invention.

In a rear view, FIG. 4 shows the blower 10 with dual tubes 12 upright and ready for an operator. In particular, the elbows 24 descend beneath the outlets 22 and generally point the tubes 12 forward of the engine E. The tubes 12 attach over the second end 28 of the elbow 24 to maintain airflow.

In use, it can now be understood that an operator pulls the starter S on the engine E. The operator then puts on the frame N, straps P, and belt Q with the frame N upon the operator's back. The operator positions the blower 10 with dual tubes 12 where needed upon a lawn. Attaining desired airflow with the control mechanism C, the operator directs both tubes 12 to move debris and leaves in a coordinated manner. The tubes 12 move left and right, as well as up and down, as directed by the operator. With work completed, the operator turns off the engine E and stores the blower 10.

While a preferred embodiment of the blower with dual tubes has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable flexible material such as resilient plastic, pleated metal tubing, or hinged tube sections may be used instead of the rubber elbow described. Also, the housing may be made of heavy-duty plastic, metal, or similar material. Although directing debris to a precise location has been described, it should be appreciated that the blower with dual tubes herein described is also suitable for removing debris from roofs and parking lots. Furthermore, a wide variety of engines and motors may be used instead of the two-cycle internal combustion engine described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In a backpack blower for blowing leaves and debris, said blower having a lightweight engine, a starter, a fuel tank, a fan powered by said engine, a frame supporting said engine, two hollow tubes, and a control mechanism, wherein the improvement comprises:
   a housing, having a front half and a rear half, said front half and said rear half mate to each other to contain said fan, a generally round shape with an intake for said fan in said rear half and two outlets from said housing;
   two elbows, having a generally round cross section on a plane normal to the longitudinal axis of said elbow, a first end and an opposite second end, a generally right angle shape whereby said first end is generally perpendicular to said second end, said first end connects with one of said outlets and said second end joins one of said tubes; and
   wherein said control mechanism is mountable on either of said tubes by an operator.

2. The blower of claim 1 wherein said outlets have a generally round cross section on a plane perpendicular to the direction of airflow through said outlet.

3. The blower of claim 1 wherein said outlets are tangential to said housing and mutually parallel, whereby said outlets direct the airflow alongside and then beneath said engine.

4. The blower of claim 1 wherein said tube is plastic.

5. The blower of claim 1 wherein said fan has a round shape and radial blades.

6. The blower of claim 1 wherein said housing is lightweight metal.

7. The blower of claim 1 wherein said housing is plastic.

8. The blower of claim 1 wherein said front half and said rear half join together by fasteners placed through a plurality of matching tabs arrayed around the perimeter of said front half and said rear half of said housing.

9. The blower of claim 1 further comprising said frame having two straps and a belt.

10. A method of blowing leaves and debris with a backpack-mounted apparatus that generates airflow within a housing from an engine powered blower, the steps comprising:
   obtaining the blower of claim 9;
   positioning said two outlets tangential to said housing and mutually parallel; and,
   connecting said two elbows to said outlets; and
   joining said hollow tubes to said elbows, whereby said elbows rotate and bend to permit an operator to direct leaves and/or debris with airflow from said two tubes;

placing said straps over said operator's shoulders;

encircling said operator's waist with said belt;

starting said engine;

grasping said tubes; and aiming said tubes to direct said airflow from said tubes at said leaves and/or debris while controlling said engine by manipulating said control mechanism.

11. In a backpack blower for blowing leaves and debris, said blower having a lightweight engine, a starter, a fuel tank, a fan powered by said engine, wherein said fan rotates perpendicularly to a ground surface, a frame supporting said engine, two tubes, a control mechanism mounted upon one of said tubes, and said tubes being hollow, wherein the improvement comprises:

a housing, having a front half that mates to a rear half, a generally round shape with an intake for said fan in said rear half and two tangential outlets from said housing;

two elbows, having a generally round cross section on a plane normal to the longitudinal axis of said elbow, a first end and an opposite second end, a generally right angle shape whereby said first end is generally perpendicular to said second end, said first end connects with one of said outlets and said second end joins one of said tubes; and wherein said control mechanism is mountable on either of said tubes by an operator.

12. The blower of claim 11 wherein said outlets have a circumferential groove on the interior of said outlets proximate to the end of said outlets farthest from said housing and said elbows have a flange upon said first end whereby said flange fits within said groove allowing said elbow to rotate about the longitudinal axis of said outlet.

13. The blower of claim 11 wherein said second end of said elbow has two or more first flanges that engage second flanges on the interior of said tube, thereby attaching said elbow to said tube.

14. The blower of claim 11 wherein said second end of said elbow has circumferential threads that engage matching threads on the interior of said tube, thereby attaching said elbow to said tube.

15. The blower of claim 11 wherein said elbow is rubber.

16. The blower of claim 11 wherein said elbow is a resilient plastic.

17. The blower of claim 11 wherein said elbow is plastic with circumferential pleats.

18. The blower of claim 11 wherein said tube is plastic.

19. The blower of claim 11 wherein said tube is metal.

* * * * *